United States Patent Office 3,791,949
Patented Feb. 12, 1974

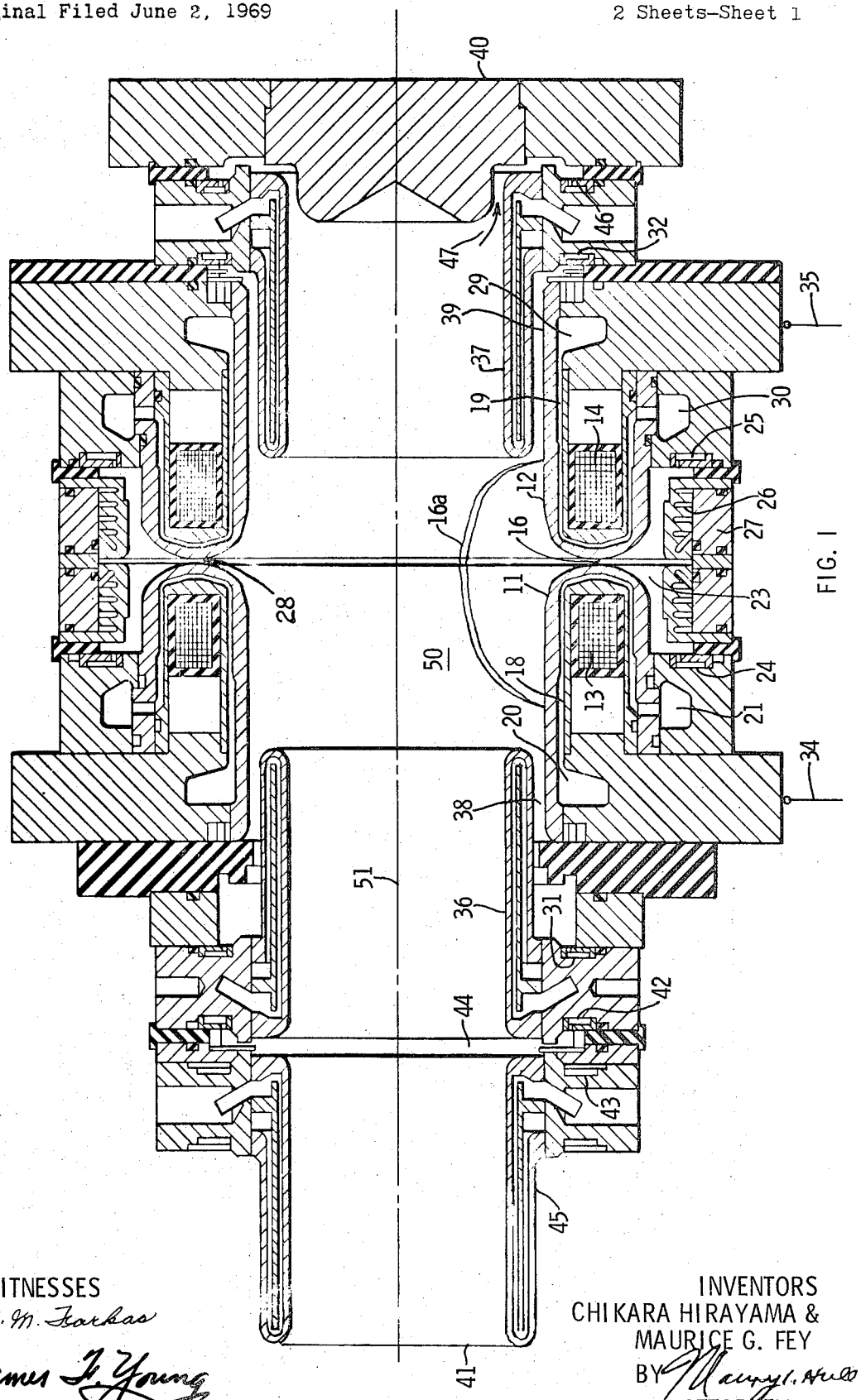

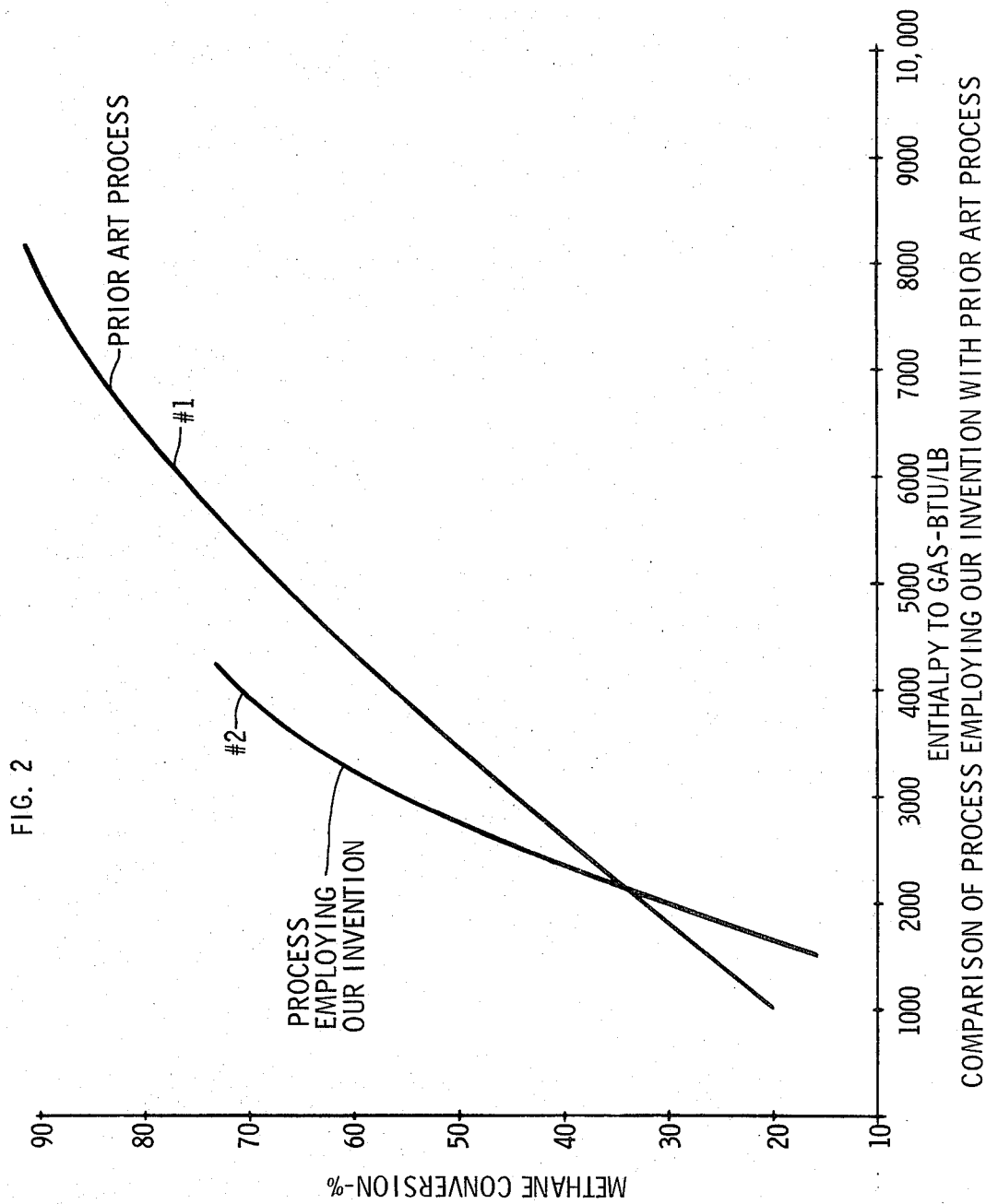

3,791,949
PROCESSES FOR CHEMICAL CONVERSION
Chikara Hirayama, Murrysville, and Maurice G. Fey, Turtle Creek, Pa., assignors to Westinghouse Electric Corporation, Pittsburgh, Pa.
Continuation of abandoned application Ser. No. 829,452, June 2, 1969. This application Dec. 9, 1971, Ser. No. 206,401
Int. Cl. C07b *29/06;* C07c *3/48;* C01b *21/20*
U.S. Cl. 204—171                                                7 Claims

ABSTRACT OF THE DISCLOSURE

A process for chemical conversion of a process gas into a desired product gas characterized by introducing a process gas at a very high velocity between a pair of longitudinally spaced annular electrodes, elongating an arc between the electrodes and increasing the turbulence within the electrodes forming an arc chamber so that the rate of recombination of the atoms, molecules, and free radicals of the disassociated process gas is increased by chemical recombination occurring at a higher percentage of the total gas, the arc being periodically elongated to a length where the arc voltage exceeds the breakdown voltage between the electrodes so that the gap between the electrodes breaks down, the arc is transferred to the gap, and the process of gap breakdown and arc elongation is repeated cyclically.

---

This is a continuation of application Ser. No. 829,452 filed June 2, 1969 (now abandoned).

CROSS REFERENCE TO RELATED APPLICATIONS

This application is related to the application of K. H. Yoon, et al. for "An Arc Heater With a Spirally Rotating Arc," Ser. No. 764,090, filed Oct. 1, 1968, now U.S. Pat. 3,575,633 and to the application of M. G. Fey et al. for "A Recurrent Arc Heating Process," Ser. No. 790,417, filed Jan. 10, 1969, now U.S. Pat. 3,629,553, both of said applications being assigned to the assignee of the instant invention.

BACKGROUND OF THE INVENTION

Field of the invention

The invention relates to improved and more efficient processes for chemical conversion of one or more fluids to a desired recombination product.

Description of the prior art

Chemical conversion processes in which an electric arc is used to pyrolyze a gas and to decompose the gas or gases into atoms, molecules and free radicals which recombine when cooled to a temperature within a certain temperature range to provide a desired recombination product are well known in the art. In one such prior art process, an arc between electrodes is caused to rotate substantially continuously to provide some turbulence, and where alternating current supplies the arc, the direction of rotation is usually reversed after each alternation providing increased turbulence, but the turbulence is dependent upon the frequency at which the direction of rotation is reversed and the speed of movement. Furthermore, the mass flow rate of gas to be pyrolyzed in prior art processes has usually been limited by stability of the arc considerations, since the arc may be extinguished by high flow rates. As a result heating efficiency in prior art processes has been small, chemical conversion efficiency has been small, reactant enthalpy requirements have been high as well as specific energy requirements, and prior art processes have not been able to approach the theoretical minimum limit for a specific energy requirement.

SUMMARY OF THE INVENTION

In our process greatly increased turbulence is imported to the heated gas in the confined area and there is substantial improvement in turbulent mixing of the reactants within a confined area where more than one reactant is employed as a result of the increased volumetric flow rate which can be attained; stability of the arc is no longer a limiting factor since our arc periodically returns to the gap, and in a sense we use arc instability to provide increased heating efficiency, and furthermore chemical conversion is substantially independent of the rotational speed of the arc movement and rate of reversal of direction. Our process has the capability of a tenfold increase in volumetric flow rate over the maximum flow rate which prior art arc processes could employ without producing undesirable instability of the arc. Our process requires a lower enthalpy imparted to the gas than that required in prior art processes because we increase the recombination rate markedly by greatly increased turbulence.

In the conversion of methane, for example, to acetylene and hydrogen, it is desirable to operate at approximately 50% methane conversion for the most economical energy utilization and our process permits this. In prior art processes for the conversion of the particular process gas methane to acetylene, a reactant enthalpy of about 3500 B.t.u./lb. is required whereas in the process of our invention only about 2700 B.t.u./lb. is required. In our process the increased mass flow through the short gap produced the optimum conversion level; coupled with higher thermal efficiency of our process and the reduced gas enthalpy, these results in a specific energy requirement for acetylene production which is significantly lower than the previously obtained levels of 4.5 to 5.5 kw. per hr./lb. of acetylene required in prior art processes. In our process typical energy requirements are in the range of 2.8 to 3.5 kw. per hr./lb. of acetylene, and these values approach the theoretical minimum energy requirements for this chemical reaction. In our process, the acetylene concentration in the product gas, that is, the total heat output, is increased from the prior art figure of about 10 to 11 mole percent to about 12.5 to 13.5 mole percent. This increased acetylene concentration results in a substantial reduction in the cost of acetylene recovery.

Further summarizing we convert a process gas into a desired product gas by introducing the process gas at a very high velocity between electrodes thereby elongating the arc and increasing the turbulence in an arc chamber so that the rate of recombination of the atoms, molecules and free radicals is increased and chemical recombination can occur at a higher percentage of the total gas. The arc is periodically elongated to a length where the arc voltage exceeds the breakdown voltage between electrodes, at which the gap between electrodes breaks down again, the arc is transferred to the gap and the process of gap breakdown and arc elongation is repeated over and over.

BRIEF DESCRIPTION OF THE DRAWINGS

FIG. 1 is a view of apparatus suitable for practicing the process of our invention; and FIG. 2 is two graphs showing the percent methane conversion with prior art processes employing prior art arc heaters and the precent of methane conversion attained with the process of our invention.

DESCRIPTION OF THE PREFERRED EMBODIMENT

In FIG. 1, the electrodes are preferably generally annular, axially spaced and designated 11 and 12, having field coils 13 and 14 therein respectively. Typical gap 28 distances are .020 inch to .080 inch. It will be understood that an arc 16 is first formed in the gap 28 between the electrodes when gap breakdown occurs and is immediately elongated by the high velocity gas passing through the gap between electrodes to take an arc path designated 16a. Because of the arc 16a, which arc it is understood is very dynamic and unstable, a great deal of turbulence occurs and it becomes unnecessary to raise the gas temperature to an enthalpy corresponding to that of conventional arc heaters as seen by the graphs of FIG. 2. Electrodes 11 and 12 have passageways therein for the flow of cooling fluid, these being designated 18 and 19 respectively, passageway 18 communicating with fluid outlet and inlet headers 20 and 21 at the ends thereof, passageway 19 communicating with fluid inlet and outlet headers 30 and 29. The process gas according to one process comes into the space 23 through gas inlet headers 24 and 25 and is blasted through the gap 28 at high velocity, which may approach the speed of sound. The heat shield 27 enclosing space 23 is cooled by axially spaced annular passageways therein through which cooling fluid flows. Leads 34 and 35 symbolize means for connecting the electrodes to terminals of opposite polarity of a source of potential to produce arc 16 (and 16a). The source may be direct current or alternating current.

Heat shields 36 and 37 have fluid inlet headers 31 and 32 respectively for introducing fluid through spaces 38 and 39 between the heat shields and adjacent electrodes. The upstream end of the arc heater is closed by plug 40, and at the downstream end nozzle member 45 has the orifice or exhaust vent 41. There are seen to be fluid headers 42 and 43 for introducing fluid in a substantially circular path in the space 44 between heat shield 36 and nozzle 41. Likewise, there is a fluid header 46 for introducing fluid in the space 47 between the upstream heat shield 37 and the closure member or plug 40.

It will be understood that headers 20, 21, 24, 25, 29 and 30 all have inlets or outlets thereto extending to the outside of the arc heater, these not being shown in the plane selected for illustration.

It will be understood that the aforementioned passageways in addition to the gap between electrodes for introducing fluid into the arc chamber 50 may or may not be employed depending on the chemical conversion process to be carried out. A quenching fluid or fluids may be introduced through one or more of these paths. It will be further understood that FIG. 1 shows in section only one half of an arc heater, the axis line being shown at 51, and that the other half of the arc heater is axially symmetrical to that shown. In accordance with chemical conversion practice, a quenching fluid may be introduced into the chamber 50 to quickly cool the pyrolyzed process gas to a temperature within a range at which the desired recombination product is present in substantial proportion. This quenching fluid is sometimes water but is more frequently a gas which may be the same as the process gas, but since it does not pass through the arc path it is much cooler than the pyrolyzed process gas, or the quenching gas may be some other reactant. The arc heater of FIG. 1 shows four positions for introducing quenching material; these are the spaces 44, 38, 39 and 47, any or all of which may be selectively employed. In addition to adding a quenching gas to cool the gas mixture to the temperature range mentioned above, a fluid spray may be introduced downstream of the quenching fluid to "freeze" the recombination product and deter further undesirable chemical changes.

Magnetic field coils 13 and 14 are so energized from a source of direct current potential, not shown for convenience of illustration, that their fields oppose each other resulting in a strong magnetic field component transverse to the arcing surfaces of the electrodes and transverse to the arc path. According to the left-hand or Fleming's rule, a force is exerted on the arc which is perpendicular to the arc current path and perpendicular to the magnetic field; this force on the arc is in such a direction as to cause the arc to move substantially continuously around the electrodes; where an alternating current source supplies the arc current, the arc reverses its direction of rotation following each alternation.

Particular reference is made now to FIG. 2 and to Tables I and III. Table III shows that methane conversions of 49.7% and 56.3% (Tests H321 and H366) were obtained; energy requirements in kw. hrs./lb. $C_2H_2$ were 2.85 and 2.92 respectively. While ideally a conversion of 100% of the process gas would be desirable, a chemical conversion of approximately 50% methane is at or near the optimum which can be attained without excessive production of carbon, and in a sense is the most economical in its energy requirement in power supplied to the arc since for conversion factors above this percentage more of the electrical energy goes into the conversion of carbon. It is to be noted from Table I that in our invention 50% conversion of methane is obtainable with an enthalpy to gas of approximately 2700 B.t.u./lb. (Test H321), whereas, in prior art processes using conventional arc heaters, chemical conversion of 50% methane requires an enthalpy to gas of approximately 3500 B.t.u./lb. These relationships are also shown in the curves of FIG. 2.

Tables I, II and III show actual test results employing the process of our invention. In Table I the column headed efficiency relates to heater efficiency, and is the heater kilowatts input, minus the kilowatts lost to cooling fluid in the passageways, divided by the kilowatts input to the heater. It is to be noted that for the higher mass flow rates, that is, the mass flow of the process gas in pounds per second, the enthalpy to the gas consistently goes down. The enthalpy drops because heat input is constant and mass flow is increased. As previously stated an increase in mass flow rate results in an increase in the turbulence within the arc chamber; increased turbulence itself results in an increase in the recombination rate of atoms, molecules, and free radicals, so that the heat energy required to be imparted to the gas can be correspondingly reduced. At a heater efficiency of 78.7% with a mass flow rate of .555 pound per second, the enthalpy to the gas is only 2100 B.t.u./lb., representing a considerable saving in electrical energy.

There is also Table II which shows a product gas analysis in mole percent of the total output from exhaust nozzle 45 of the heater of the test runs shown in Table I. The process gas is again methane, $CH_4$, and the most desired product is acetylene, $C_2H_2$. It is seen from the fourth column that the percentage of $C_2H_2$ produced may be in the range 13%–14%, representing a considerable improvement in conversion efficiency over prior art processes.

Table III shows the chemical performance of our process employing a short gap with periodic arc elongation and periodic breakdown of the gap and return of the arc to the gap. The second column represents the percentage of $CH_4$ converted to one or more other products, one being acetylene, and it is to be noted in test H338 where 50.6% of the $CH_4$ was converted, the maximum yield of acetylene of 14.1% was obtained with one of the lowest energy inputs in kilowatts per hour per pound of acetylene, the figure being 3.13.

In prior art processes, where the arc employed in heating the gas remains in a gap between electrodes, turbulence is imparted to the gas in the arc chamber primarily by the rotating arc, and further turbulence occurs when the arc reverses its direction of rotation.

In our process, great turbulence results from the increased mass flow rate, which may be ten times that previously obtainable without causing the arc to become unstable or be extinguished. Additional turbulence results from pressure perturbations which result from the power fluctuations which occur when the arc goes from the gap to its elongated state and back again. This cyclic process usually occurs many times per alternation of the alternating current, but occurs at least once per alternation following current zero. The speed of arc rotation and rate of reversal of direction are minor factors in contributing to the total turbulence in the gas in the arc chamber.

As previously stated, increasing the turbulence of the gas increases the rate at which atoms, molecules and free radicals recombine to form the desired recombination product, thereby increasing the efficiency of chemical conversion, while at the same time reducing the enthalpy which must be imparted to the process gas.

By way of further summary, our process includes forming an arc in a gap which may be annular while maintaining at all times a system voltage sufficiently great to cause breakdown of the gap, passing process gas through said gap at a high velocity whereby the arc is caused to leave the gap and is elongated until the length of the arc is so great that the voltage required to sustain the arc equals or exceeds the breakdown voltage of the gap, whereupon breakdown occurs, the arc returns to the gap and the cycle is repeated. Because the arc while elongated goes through extreme turbulence which is transferred to all of the process gas within the arc chamber, there is an increase in the recombination rate of free atoms, molecules and free radicals of the process gas, so that it is not necessary to heat the gas to a temperature at which enthalpies corresponding to those of prior art processes are produced, with a saving of electrical power and an increased efficiency in conversion of the process gas to the desired product gas. As previously stated quenching may be provided in any desired manner at one or more of the paths for introducing a quenching fluid.

In our process for chemical conversion of methane to acetylene, the methane may be heated to a temperature within the range 1000 deg. K. to 2500 deg. K., with best operating conditions for a maximum yield of $C_2H_2$ with least carbon in the range 1500 deg. K. to 2000 deg. K. The pyrolyzed gas is quenched to 500 deg. C. or lower as quickly as possible to reduce the amount of carbon produced. It is desirable that the rate of conversion of $C_2H_2$ to carbon belong compared to the quenching rate. Quenching may be accomplished by adding a cooling gas, such as hydrocarbon, through for example passageway 38 and water spray through the further downstream passageway 44, or a cooling gas or water may be solely relied on.

As examples of other specific processes which may be carried out with improved conversion efficiency according to the methods of our invention, one is the pyrolysis of methane and nitrogen to produce hydrogen cyanide as the desired recombination product. Another is one in which the desired recombination product is nitric acid; air is passed through the gap and heated to about 3500 deg. K. where part of the oxygen and nitrogen in the air react to form NO. Thereafter this is rapidly quenched and cooled to a temperature in the range 1500 deg. K. to 2000 deg. K. and the NO oxidized by admitting oxygen downstream, for example through passageway 38, to produce $NO_2$. Water is injected into the $NO_2$, for example through passageway 44, and reacts with the $NO_2$ to produce $HNO_3$.

TABLE I.—HEATER OPERATING PARAMETERS

| Test number | Arc Current, amps | Arc Voltage, volts | Efficiency, percent | Mass flow, lb. m./sec. | Enthalpy to gas, B.t.u./lb. m. |
|---|---|---|---|---|---|
| H313 | 2,840 | 610 | 76.5 | 0.362 | 4,200 |
| H314 | 2,780 | 525 | 70.5 | 0.362 | 3,200 |
| H316 | 1,970 | 590 | 71.4 | 0.364 | 2,695 |
| H321 | 2,670 | 550 | 76.9 | 0.495 | 2,655 |
| H338 | 3,250 | 715 | 72.6 | 0.511 | 2,830 |
| H355 | 2,120 | 828 | 78.7 | 0.555 | 2,100 |
| H359 | 2,680 | 740 | 79.3 | 0.474 | 3,520 |
| H366 | 2,610 | 885 | 79.5 | 0.554 | 2,900 |

TABLE II.—PRODUCT GAS ANALYSIS—MOLE PERCENT

| Test number | $CH_4$ | $C_2H_6$ | $C_2H_2$ | $C_2H_4$ | $C_3H_4$ | $C_4H_2$ | $H_2$ |
|---|---|---|---|---|---|---|---|
| H313 | 15.27 | | 13.25 | .81 | .21 | .45 | 68.42 |
| H314 | 30.23 | | 13.44 | .62 | .30 | .60 | 54.72 |
| H316 | 35.13 | | 12.29 | .83 | .30 | .54 | 50.81 |
| H321 | 33.4 | | 13.1 | .69 | .23 | .57 | 50.2 |
| H338 | 33.94 | .42 | 14.23 | .94 | .40 | .64 | 49.25 |
| H355 | 44.71 | .90 | 10.11 | .76 | .29 | .46 | 42.34 |
| H359 | 20.63 | .26 | 13.50 | 1.05 | .25 | .49 | 63.55 |
| H366 | 33.76 | .56 | 12.16 | 1.04 | .28 | .58 | 50.99 |

TABLE III.—CHEMICAL PERFORMANCE OF SHORT GAP HEATER

| Test number | Conversion, percent | Acetylene, percent | Energy requirements kw. hr./lb. m. $C_2H_2$ |
|---|---|---|---|
| H313 | 73.4 | 12.1 | 3.85 |
| H314 | 54.2 | 13.4 | 3.50 |
| H316 | 48.5 | 11.9 | 3.10 |
| H321 | 49.7 | 13.1 | 2.85 |
| H338 | 50.6 | 14.1 | 3.13 |
| H355 | 38.1 | 9.7 | 3.23 |
| H359 | 65.9 | 12.3 | 3.31 |
| H366 | 56.3 | 12.8 | 2.92 |

The aforegoing drawings merely show one type of apparatus suitable for practicing the improved process of our invention, and the written description describes the processes of our invention with respect to an arc gap which is very short and in which a sparkover can be produced by the system voltage, no particular type of arc heater apparatus being essential to the practice of the process. Therefore the drawings and the foregoing written description are illustrative and exemplary only and are not to be interpreted in a limiting sense.

We claim as our invention:

1. A process for chemical conversion of a methane into acetylene at reduced enthalpy requirements and with greater efficiency comprising the steps of forming an electric arc in a breakdown gap of predetermined width of 0.020–0.080 inch between two axially spaced generally annular electrodes which electrodes have inner surfaces that enclose an elongated arc chamber of substantially uniform diameter longitudinally thereof and in which a chemical conversion process is carried out, maintaining a system voltage at all times sufficiently great to cause breakdown of the gap, generating a magnetic field which extends through the breakdown gap and the portions of the two electrodes adjacent thereto for exerting a force on the arc and transverse to the inner surfaces which causes the points of arc attachment on the two electrodes to move substantially continuously around the inner surfaces of the electrodes, creating a highly dynamic gas turbulence within the arc chamber by pressure perturbations and by introducing methane through the gap at a flow rate of at least 0.495 lb. m./second sufficient to cause repetitive removal of the arc from the gap and into the chamber with the points of arc attachment on the inner surface of the electrodes moving from the gap until the arc is elongated to a length where the arc voltage at least equals the sparkover voltage and the arc is reinitiated in the gap, and channeling the methane through the arc chamber and through the rotating and repetitively elongating arc to intermix the process and product gases in the chamber at a temperature of from about 1000° K. to 2500° K. and to recombine the atoms, molecules, and free radicals of the process and product gases to yield a desired product gas.

2. The process according to claim 1 which includes the additional step of introducing a cooling fluid into the arc chamber downstream of the gap to cool the product gas to a temperature within a desired temperature range.

3. The process according to claim 1 in which the product gas exits from the arc chamber in one direction.

4. The process according to claim 1 in which the flow rate of the process gas through the gap approaches the speed of sound.

5. The process according to claim 1 in which the process gas is heated to a temperature of from about 1500° K. to 2000° K.

6. The process according to claim 1 in which the enthalpy of the process gas is about 2100 B.t.u./lb.

7. The process according to claim 1 in which the electrical energy requirement in kilowatts per hour per pound of acetylene is in the order of about 3.13.

References Cited

UNITED STATES PATENTS

| | | | |
|---|---|---|---|
| 2,074,530 | 3/1937 | Baumann et al. | 204—171 |
| 3,328,276 | 6/1967 | Schmidt et al. | 204—171 X |
| 3,400,070 | 9/1968 | Noff | 204—170 X |
| 3,522,015 | 7/1970 | Maniero et al. | 204—323 |
| 3,554,715 | 1/1971 | Brouning et al. | 204—171 |

FREDERICK C. EDMUNDSON, Primary Examiner

U.S. Cl. X.R.

204—179